(12) United States Patent
Arai et al.

(10) Patent No.: US 12,397,631 B2
(45) Date of Patent: Aug. 26, 2025

(54) VEHICLE BATTERY COOLING SYSTEM AND ELECTRICALLY POWERED VEHICLE

(71) Applicant: SUBARU CORPORATION, Tokyo (JP)

(72) Inventors: Yoshitaka Arai, Tokyo (JP); Tomoya Iwata, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 237 days.

(21) Appl. No.: 18/231,346

(22) Filed: Aug. 8, 2023

(65) Prior Publication Data
US 2024/0066974 A1 Feb. 29, 2024

(30) Foreign Application Priority Data
Aug. 23, 2022 (JP) .................. 2022-132668

(51) Int. Cl.
*H01M 10/625* (2014.01)
*B60K 11/04* (2006.01)
(Continued)

(52) U.S. Cl.
CPC .......... *B60K 11/04* (2013.01); *H01M 10/613* (2015.04); *H01M 10/625* (2015.04); *H01M 10/633* (2015.04); *H01M 10/6551* (2015.04); *H01M 10/6568* (2015.04); *B60S 1/023* (2013.01); *B60S 1/481* (2013.01); *B60S 1/487* (2013.01); *B60S 1/50* (2013.01); *B60S 1/52* (2013.01); *H01M 2220/20* (2013.01)

(58) Field of Classification Search
None
See application file for complete search history.

(56) References Cited

U.S. PATENT DOCUMENTS 9,625,220 B1* 4/2017 Ahbel .................. H01L 23/34
2009/0065175 A1* 3/2009 Bang .................. H01L 23/367
165/80.3
(Continued)

FOREIGN PATENT DOCUMENTS

JP 2013-99024 A1 5/2013

*Primary Examiner* — Peter D Nolan
*Assistant Examiner* — Jacob Kent Besteman-Street
(74) *Attorney, Agent, or Firm* — TROUTMAN PEPPER LOCKE LLP

(57) ABSTRACT

A vehicle battery cooling system that cools a battery built in an electrically powered vehicle includes a water storage tank, a circulating mechanism, a nozzle, a radiating fin, and a processor. The water storage tank is disposed inside the electrically powered vehicle and near the battery, and stores cooling water for cooling the battery. The circulating mechanism causes, when electric power is supplied from an external facility to the battery, the cooling water supplied from the external facility to circulate through the battery and the water storage tank. The nozzle injects the cooling water supplied from the circulating mechanism into a predetermined part of the electrically powered vehicle. The radiating fin is foldable and controls heat transfer between the battery and the water storage tank. The processor controls respective operations of the circulating mechanism and the nozzle, and switching between open and closed states of the radiating fin.

6 Claims, 3 Drawing Sheets

(51) Int. Cl.
*H01M 10/613* (2014.01)
*H01M 10/633* (2014.01)
*H01M 10/6551* (2014.01)
*H01M 10/6568* (2014.01)
*B60S 1/02* (2006.01)
*B60S 1/48* (2006.01)
*B60S 1/50* (2006.01)
*B60S 1/52* (2006.01)

(56) References Cited

U.S. PATENT DOCUMENTS

2009/0223648 A1* 9/2009 Martin .................. F28F 1/40
                                                                165/86
2019/0118661 A1* 4/2019 Kim .................. H02J 7/007192
2023/0415593 A1* 12/2023 Lee .................... H01M 10/615

* cited by examiner

VEHICLE BATTERY COOLING SYSTEM AND ELECTRICALLY POWERED VEHICLE

CROSS-REFERENCE TO RELATED APPLICATION

The present application claims priority from Japanese Patent Application No. 2022-132668 filed on Aug. 23, 2022, the entire contents of which are hereby incorporated by reference.

BACKGROUND

The disclosure relates to a vehicle battery cooling system, and an electrically powered vehicle including such a vehicle battery cooling system.

Various techniques are disclosed regarding a system that cools a battery, i.e., a vehicle battery cooling system, that is built in an electrically powered vehicle. For example, reference is made to Japanese Unexamined Patent Application Publication No. 2013-99024.

SUMMARY

An aspect of the disclosure provides a vehicle battery cooling system configured to cool a battery built in an electrically powered vehicle. The vehicle battery cooling system includes a water storage tank, a circulating mechanism, a nozzle, a radiating fin, and a processor. The water storage tank is disposed inside the electrically powered vehicle and in a vicinity of the battery, and is configured to store cooling water for cooling the battery. The circulating mechanism is configured to cause, when electric power is supplied from an external facility to the battery, the cooling water supplied from the external facility to circulate through the battery and the water storage tank. The nozzle is configured to inject the cooling water supplied from the circulating mechanism into a predetermined part of a body of the electrically powered vehicle. The radiating fin is foldable and configured to control transfer of heat between the battery and the water storage tank. The processor configured to control respective operations of the circulating mechanism and the nozzle, and switching between an open state and a closed state of the radiating fin.

An aspect of the disclosure provides an electrically powered vehicle. The electrically powered vehicle includes a vehicle battery cooling system. The vehicle battery cooling system includes a water storage tank, a circulating mechanism, a nozzle, a radiating fin, and a processor. The water storage tank is disposed inside the electrically powered vehicle and in a vicinity of the battery, and is configured to store cooling water for cooling the battery. The circulating mechanism is configured to cause, when electric power is supplied from an external facility to the battery, the cooling water supplied from the external facility to circulate through the battery and the water storage tank. The nozzle is configured to inject the cooling water supplied from the circulating mechanism into a predetermined part of a body of the electrically powered vehicle. The radiating fin is foldable and configured to control transfer of heat between the battery and the water storage tank. The processor configured to control respective operations of the circulating mechanism and the nozzle, and switching between an open state and a closed state of the radiating fin.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
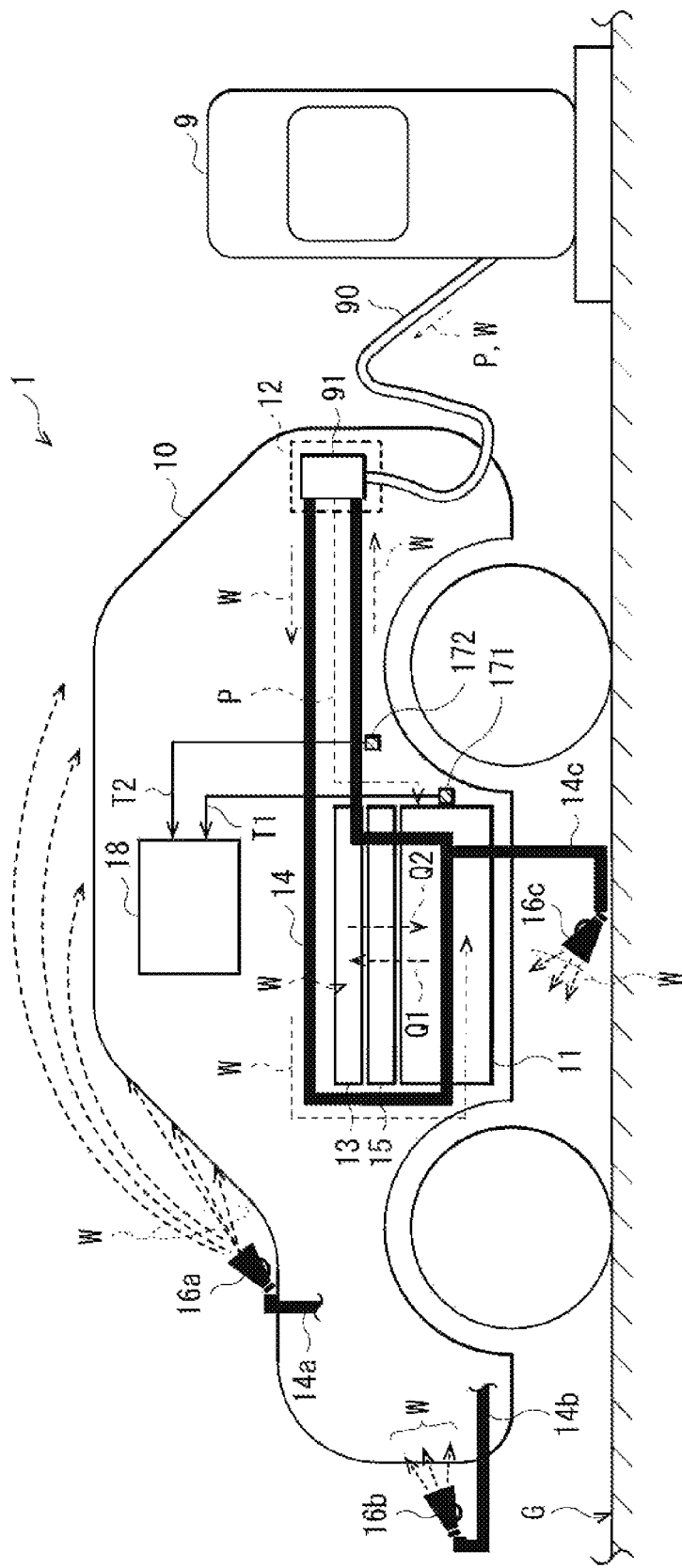
FIG. 1 is a block diagram illustrating an exemplary schematic configuration of, for example, an electrically powered vehicle according to one example embodiment of the disclosure.

In a vehicle battery cooling system, it is desirable to improve, for example, convenience, and to improve cooling efficiency of a battery. It is desirable to provide: a vehicle battery cooling system that is able to improve the cooling efficiency of the battery while improving, for example, the convenience; and an electrically powered vehicle including such a vehicle battery cooling system.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. Note that description is given in the following order.

FIG. 1 is a block diagram illustrating an exemplary schematic configuration of an electrically powered vehicle, i.e., an electrically powered vehicle 1, according to an example embodiment of the disclosure. The electrically powered vehicle 1 may include an electric vehicle (EV) or a hybrid vehicle (HEV).

The electrically powered vehicle 1 may include a body 10, a battery 11, a coupler 12, a water storage tank 13, a circulating mechanism 14, branched flow paths 14a to 14c, a radiating fin 15, nozzles 16a to 16c, temperature sensors 171 and 172, and a processor 18. As illustrated in FIG. 1, a battery charger/water supplier 9 serving as an external facility installed on a ground G may be provided in the vicinity of the electrically powered vehicle 1. In the electrically powered vehicle 1, the battery charger/water supplier 9 may charge the battery 11, i.e., supply electric power P to the battery 11, and supply cooling water W to the battery 11 via a coupling cable 90 and a plug 91, which will be described in detail later.

In one embodiment, the water storage tank 13, the circulating mechanism 14, the radiating fin 15, the nozzles 16a to 16c, and the processor 18 may serve as a "vehicle battery cooling system (system configured to cool a battery built in an electrically powered vehicle)". In one embodiment, the battery charger/water supplier 9 may serve as an "external facility".

The battery 11 may store electric power to be used in the electrically powered vehicle 1, and may include various types of secondary batteries such as lithium-ion batteries.

As illustrated in FIG. 1, the coupler 12 may be a part to which the plug 91 is coupled. Via the plug 91 and the coupler 12, the electric power P transferred from the battery charger/water supplier 9 through the coupling cable 90 may be supplied to the electrically powered vehicle 1, and the cooling water W transferred from the battery charger/water supplier 9 through a flow path inside the coupling cable 90 may be supplied to the electrically powered vehicle 1.

As illustrated in FIG. 1, the water storage tank 13 is disposed inside the electrically powered vehicle 1 and in the vicinity of the battery 11. The water storage tank 13 stores the cooling water W for cooling the battery 11.

The circulating mechanism 14 is a mechanism, i.e., a circulating flow path, that causes the cooling water W to circulate through the battery 11 and the water storage tank 13 when the electric power is supplied from the battery charger/water supplier 9 to the battery 11, that is, when the battery 11 is being charged (see dashed arrows in FIG. 1). In one example, the circulating mechanism 14 may cause the cooling water W to circulate from the coupler 12, or the plug 91, through the battery 11, the radiating fin 15 to be described later, and the water storage tank 13, to the coupler 12.

Note that a period during which such circulation of the cooling water W is performed may be limited to a period in which the battery 11 is being charged, in order to prevent freezing of the cooling water W between the water storage tank 13 and each of the nozzles 16a to 16c (e.g., in the branched flow paths 14a to 14c) to be described later. In other words, the cooling water W may be collected in the water storage tank 13 except for the period in which the battery 11 is being charged.

The branched flow paths 14a to 14c may each be a part branched from the circulating mechanism 14, i.e., the circulating flow path, and may each be a flow path that supplies the cooling water W to corresponding one of the nozzles 16a to 16c. In other words, as illustrated in FIG. 1, the branched flow path 14a may be the flow path that supplies the cooling water W from the circulating mechanism 14 to the nozzle 16a. Similarly, the branched flow path 14b may be the flow path that supplies the cooling water W from the circulating mechanism 14 to the nozzle 16b, and the branched flow path 14c may be the flow path that supplies the cooling water W from the circulating mechanism 14 to the nozzle 16c.

The nozzles 16a to 16c are each be a part that injects the cooling water W supplied from the circulating mechanism 14 via corresponding one of the branched flow paths 14a to 14c into a predetermined part of the body 10 of the electrically powered vehicle 1. In one example, as illustrated in FIG. 1, the nozzle 16a may inject the cooling water W into an upper part of the body 10. The upper part of the body 10 may be, for example, a part of a front window and a part of a roof. Further, the nozzle 16b may inject the cooling water W into a front part of the body 10, and the nozzle 16c may inject the cooling water W into a lower part of the body 10. As will be described in detail later, the cooling water W may be injected into the predetermined part of the body 10 to thereby perform, for example, an ice melting process, a snow removing process, and a washing process on the body 10. The cooling water W may be warmed, as described later.

As illustrated in FIG. 1, the radiating fin 15 may be disposed between the battery 11 and the water storage tank 13. The radiating fin 15 is a foldable radiating fin, and is a member that controls transfer of heat between the battery 11 and the water storage tank 13. In one example, the radiating fin 15 may control transfer speeds of heat Q1 and heat Q2 in FIG. 1. As will be described in detail later, setting of an open/closed state of the radiating fin 15, i.e., switching between an open state and a closed state in the radiating fin 15, may be controlled by the processor 18.

As illustrated in FIG. 1, the temperature sensor 171 may be a sensor that detects a temperature T1 of the battery 11. The temperature sensor 172 may be a sensor that detects a temperature T2 of the cooling water W. In this way, respective pieces of data of the temperature T1 detected by the temperature sensor 171 and the temperature T2 detected by the temperature sensor 172 may be supplied to the processor 18.

The processor 18 is a part that controls various operations in the electrically powered vehicle 1 and performs various arithmetic processes. The various operations in the electrically powered vehicle 1 may include, for example, a traveling operation, an operation of charging the battery 11, an operation of supplying the cooling water W, an operation of circulating the cooling water W, and respective operations of various components. In one example, the processor 18 controls, for example, respective operations of the circulating mechanism 14 and the nozzles 16a to 16c, and the switching between the open state and the closed state of the radiating fin 15. As will be described in detail later, in one example, the processor 18 may control the switching between the open state and the closed state of the radiating fin 15 based on a magnitude relation between the temperature T1 of the battery 11 and the temperature T2 of the cooling water W.

Further, as will be described in detail later, the processor 18 may control respective operations of the nozzles 16a to 16c based on whether or not data indicating a residence of a user of the electrically powered vehicle 1 or data indicating a current location upon charging the electrically powered vehicle 1 represents either of a cold region or a coast area. The user of the electrically powered vehicle 1 may be, for example, a driver who drives the electrically powered vehicle 1.

Such a processor 18 may include, for example, one or more processors that execute a program, and one or more memories communicatively coupled to the processors. The processors may be, for example, central processing units (CPUs). Further, such memories may include, for example, a random access memory (RAM) that temporarily stores processing data and a read only memory (ROM) that stores a program.

Next, referring to FIGS. 2A and 2B in addition to FIG. 1, operations, workings, and example effects of the example embodiment will be described in detail.

First, during charging of a battery mounted on an electrically powered vehicle, a temperature of the battery generally increases due to heat associated with the charging. If the temperature of the battery becomes high, degradation of the battery can progress remarkably.

Accordingly, in the example embodiment, the battery 11 may be cooled with use of the cooling water W when the battery charger/water supplier 9 charges the battery 11 as described above, which suppresses, for example, the above-described degradation of the battery.

Further, the electrically powered vehicle generally has many components and harnesses provided in the lower part of a body that are necessary for driving the electrically powered vehicle. In particular, terminals of the harnesses and attachments of the body may serve as places where contamination is likely to accumulate. In a cold region or a coast area, for example, there have been many cases where dirt containing chloride is accumulated in the vicinity of the terminals, leading to corrosion and falling off.

In addition, particularly in the cold region, a case can occur where the electrically powered vehicle necessitates work including, for example, defrosting of windows and removing of snow from a roof, and is unable to get started immediately. In addition, in a case of using normal water, i.e., fresh water, during the work of removing snow, it can be presumed that the water is frozen. However, using antifreeze in such work can lead to environmental pollution, i.e., soil pollution, if the antifreeze is drained on the ground as it is, since the antifreeze includes chemical substances. Further, particularly in a case of HEV, overheating of an engine can occur if snow on a front grille of the body blocks a radiator, for example. In addition, the frequency of use of heating increases in the cold region, which in turn leads to an increase in battery energy consumption and a decrease in a cruising distance.

Accordingly, the electrically powered vehicle 1 of the example embodiment may perform various operations described in detail below.

Figure 2A:
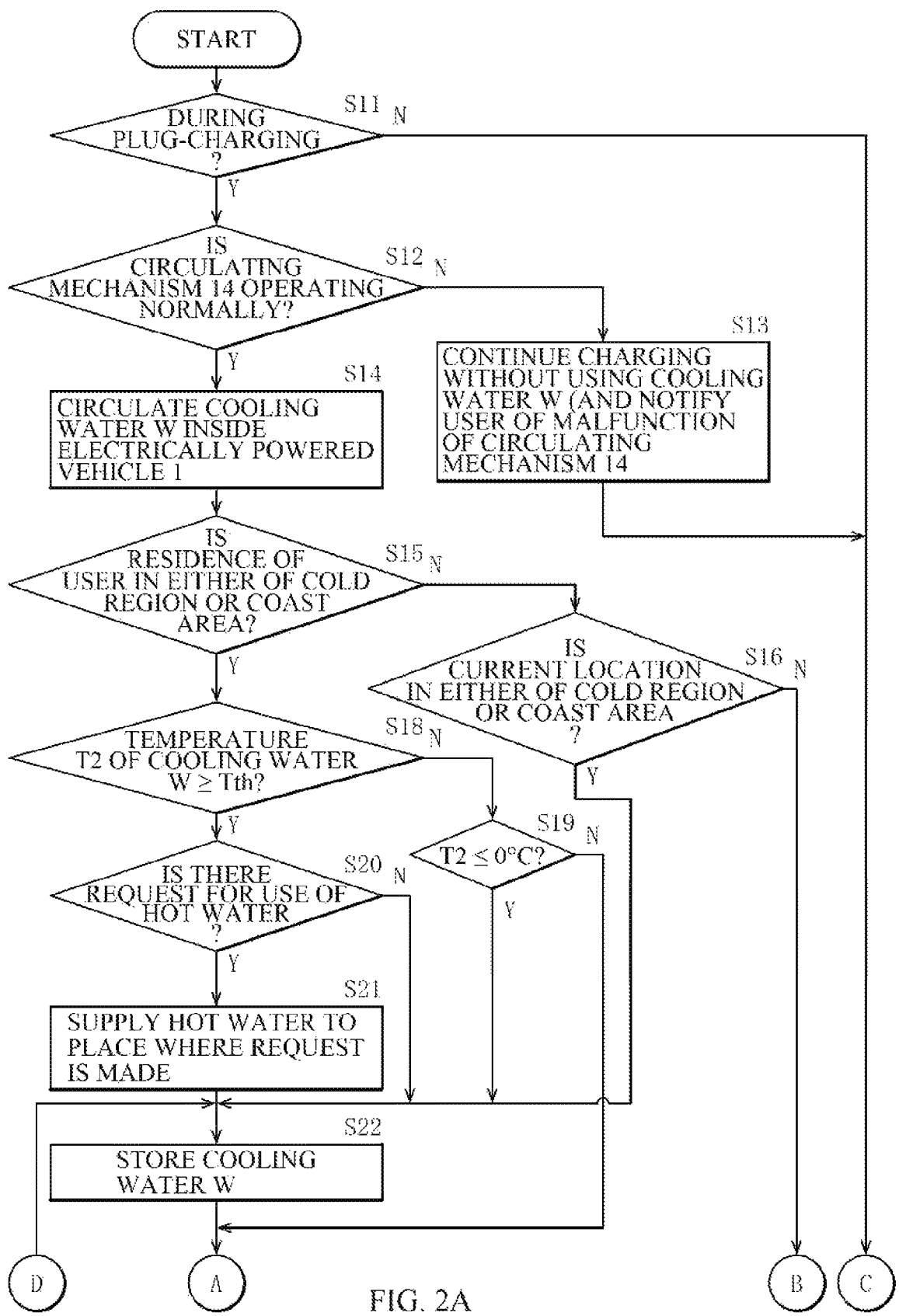
FIG. 2A is a flowchart illustrating an exemplary operation of a vehicle battery cooling system according to one example embodiment.
Figure 2B:
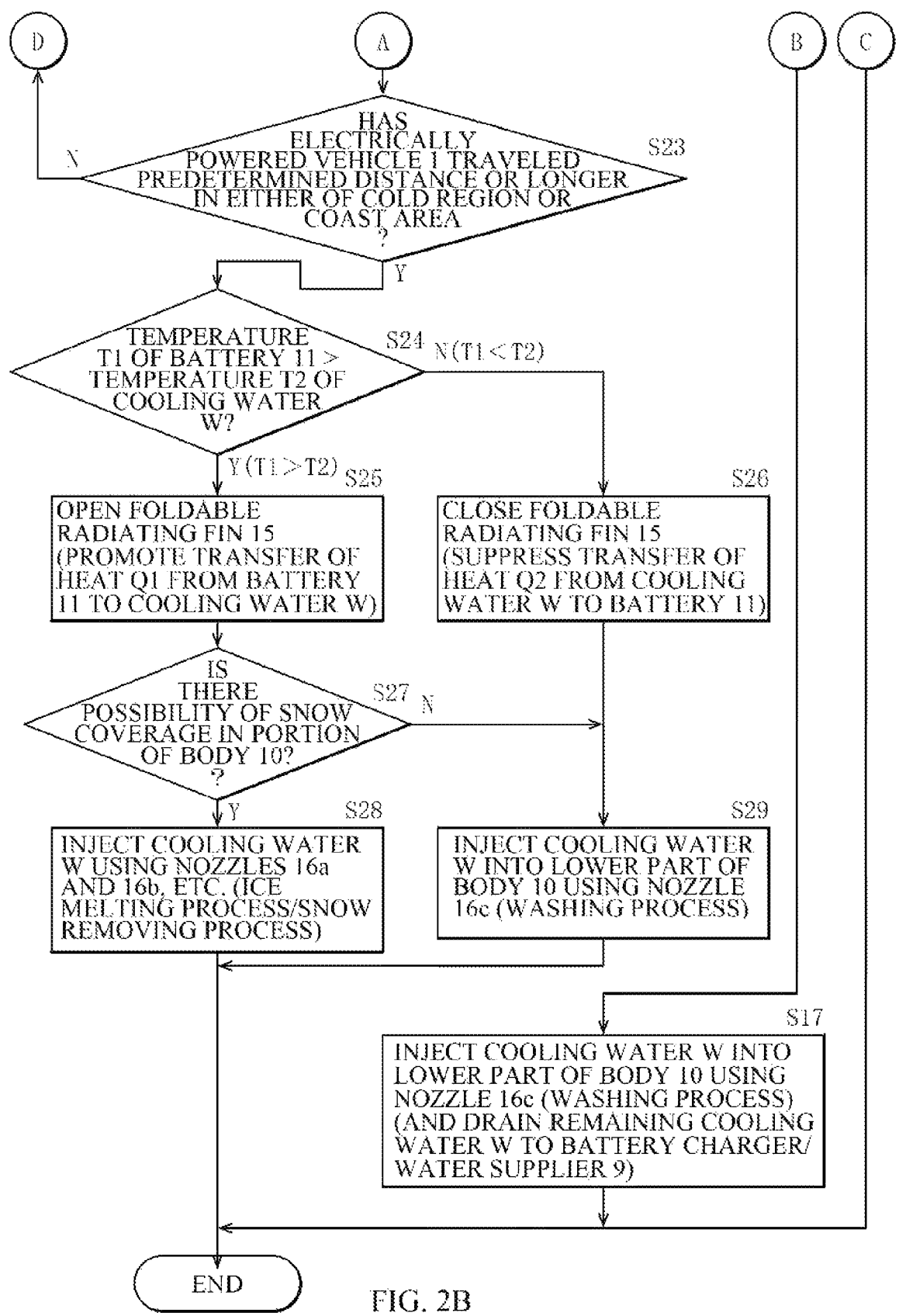
FIG. 2B is a flowchart illustrating an exemplary operation following FIG. 2A.

FIGS. 2A and 2B each illustrate a flowchart of exemplary operations including, for example, various control processes to be performed by the processor 18, in the electrically powered vehicle 1 (the vehicle battery cooling system) of the example embodiment.

In the series of exemplary operations illustrated in FIGS. 2A and 2B, first, the processor 18 may determine whether it is during plug-charging, i.e., during a period in which the battery charger/water supplier 9 charges the battery 11 via the coupling cable 90 and the plug 91 (step S11 in FIG. 2A). If the processor 18 determines that it is not during the plug-charging (step S11: N), the series of exemplary operations illustrated in FIGS. 2A and 2B may end.

If the processor 18 determines that it is during the plug-charging (step S11: Y), the processor 18 may determine whether the circulating mechanism 14 is operating normally (step S12). If the processor 18 determines that the circulating mechanism 14 is not operating normally (step S12: N), the charging of the battery 11 may be continued without using the cooling water W, and the processor 18 may notify the user of the electrically powered vehicle 1 of a malfunction of the circulating mechanism 14 (step S13). Thereafter, the series of exemplary operations illustrated in FIGS. 2A and 2B may end.

If the processor 18 determines that the circulating mechanism 14 is operating normally (step S12: Y), the processor 18 may cause the cooling water W to circulate, which is supplied from the battery charger/water supplier 9 via the coupling cable 90 and the plug 91, inside the electrically powered vehicle 1 by using the circulating mechanism 14 (step S14). The processor 18 may determine whether or not the residence of the user of the electrically powered vehicle 1 is in either of a cold region or a coast area (step S15). Note that data indicating such a residence of the user may be, for example, data previously entered by the user, or data based on position data acquired using a global positioning system (GPS).

If the processor 18 determines that the residence of the user is in neither of the cold region nor the coast area (step S15: N), the processor 18 may determine whether the current location upon charging the electrically powered vehicle 1 is in either of the cold region or the coast area (step S16). Note that data indicating such a current location may also be data based on, for example, position data acquired using the GPS.

If the processor 18 determines that the current location is in neither of the cold region nor the coast area (step S16: N), the processor 18 may inject the cooling water W into the lower part of the body 10 using the nozzle 16c, thereby performing the washing process on the lower part of the body 10 (step S17 in FIG. 2B). Further, the cooling water W remained during the washing process may be drained to the battery charger/water supplier 9 via the plug 91 and the coupling cable 90. Thereafter, the series of exemplary operations illustrated in FIGS. 2A and 2B may end. If the processor 18 determines that the current location is in either of the cold region or the coast area (step S16: Y), the process may proceed to step S22 to be described later.

If the processor 18 determines that the residence of the user is in either of the cold region or the coast area (step S15: Y), the processor 18 may determine whether or not the temperature T2 of the cooling water W acquired from the temperature sensor 172 is higher than or equal to a predetermined threshold temperature Tth (T2≥Tth) (step S18).

If the processor 18 determines that the temperature T2 of the cooling water W is lower than the threshold temperature Tth (T2<Tth) (step S18: N), the processor 18 may determine whether or not the temperature T2 of the cooling water W is lower than or equal to 0° C. (T2≤0° C.) (step S19). If the processor 18 determines that the temperature T2 of the cooling water W is lower than or equal to 0° C. (step S19: Y), the process may proceed to step S22 to be described later. If the processor 18 determines that the temperature T2 of the cooling water W is higher than 0° C. (T2>0° C.) (step S19: N), the process may proceed to step S23 to be described later.

If the processor 18 determines that the temperature T2 of the cooling water W is higher than or equal to the threshold temperature Tth (step S18: Y), the processor 18 may determine whether there is a request for use of hot water from the user of the electrically powered vehicle 1 (step S20). The hot water may be the cooling water W warmed by the heat of the battery 11. If there is no request for use of the hot water from the user (step S20: N), the process may proceed to step S22 to be described later.

If there is the request for use of the hot water from the user (step S20: Y), the processor 18 may supply the hot water to a place where such a request is made using at least one of the nozzles 16a to 16c (step S21). The place where such a request is made may be a place where the request for use of the hot water is made in the body 10 of the electrically powered vehicle 1. The processor 18 may store the cooling water W in the water storage tank 13 (step S22), and may determine whether or not the electrically powered vehicle 1 has traveled a predetermined distance or longer in either of the cold region or the coast area (step S23 in FIG. 2B).

If the processor 18 determines that the electrically powered vehicle 1 has not traveled the predetermined distance or longer in either of the cold region or the coast area (step S23: N), the process may return to step S22 described above. If the processor 18 determines that the electrically powered vehicle 1 has traveled the predetermined distance or longer in either of the cold region or the coast area (step S23: Y), the processor 18 may determine whether the temperature T1 of the battery 11 acquired from the temperature sensor 171 is higher than the temperature T2 of the cooling water W described above (T1>T2) (step S24). In the determination of step S24, the case where the temperatures T1 and T2 are equal to each other (T1=T2) is excluded for convenience.

If the processor 18 determines that the temperature T1 of the battery 11 is higher than the temperature T2 of the cooling water W (T1>T2) (step S24: Y), the processor 18 may control the open/closed state of the foldable radiating fin 15 as follows. In this case, the processor 18 may control the radiating fin 15 to be opened, i.e., set the radiating fin 15 to the open state and raise the radiating fin 15, thereby promoting transfer of the heat Q1 from the battery 11 to the cooling water W (step S25). The process may proceed to step S27 to be described later.

If the processor 18 determines that the temperature T1 of the battery 11 is lower than the temperature T2 of the cooling water W (T1<T2) (step S24: N), the processor 18 may control the open/closed state of the foldable radiating fin 15 as follows. In this case, the processor 18 may control the radiating fin 15 to be closed, i.e., set the radiating fin 15 to the closed state and cause the radiating fin 15 to lie, thereby suppressing transfer of the heat Q2 from the cooling water W to the battery 11 (step S26). The process may proceed to step S29 to be described later.

In step S27 described above, the processor 18 may determine whether there is a possibility of snow coverage in a portion of the body 10 of the electrically powered vehicle 1. If the processor 18 determines that there is the possibility of snow coverage in the portion of the body 10 (step S27: Y), the processor 18 may perform the following process using, for example, the nozzles 16a and 16b. In this case, the processor 18 may inject the cooling water W into a predetermined part, i.e., a part that may be covered by snow, of the body 10, thereby performing the ice melting process or the snow removing process on the predetermined part of the body 10 (step S28). In this case, the series of exemplary operations illustrated in FIGS. 2A and 2B may end here.

If the processor 18 determines that there is no possibility of snow coverage in the portion of the body 10 (step S27: N), the processor 18 may perform the following process using the nozzle 16c. In this case, the processor 18 may inject the cooling water W into the lower part of the body 10, thereby performing the washing process on the lower part of the body 10 (step S29). In this case also, the series of exemplary operations illustrated in FIGS. 2A and 2B may end here.

According to the electrically powered vehicle 1 of the example embodiment described above, when the electric power is supplied from the battery charger/water supplier 9 to the battery 11, the cooling water W supplied from the battery charger/water supplier 9 circulates via the battery 11 and the water storage tank 13. The water storage tank 13 is disposed in the vicinity of the battery 11 and stores the cooling water W. The circulation of the cooling water W cools the battery 11. This suppresses the degradation of the battery 11. Further, while the battery 11 is being cooled, the heat of the battery 11 is transferred to the cooling water W. This makes it unnecessary to use the antifreeze as the cooling water W, and thus, it is possible to use the fresh water. Accordingly, a cost of the cooling water W is reduced, and the environmental pollution, i.e., the soil pollution, caused by the chemical substances included in the antifreeze as described above is also avoided.

Further, in the example embodiment, the cooling water W supplied from the circulating mechanism 14 is injected into the above-described predetermined part in the body 10 by the nozzles 16a to 16c. Thus, upon cooling the battery 11, the cooling water W, i.e., the hot water, heated by the heat of the battery 11 is injected into the predetermined part of the body 10, which makes it possible to perform, for example, the ice melting process, the snow removing process, and the washing process on the body 10. As a result, for example, it is possible to prevent the components from falling off due to the corrosion in the lower part of the body 10 described above, or to perform the work including, for example, the defrosting of the windows and the removing of snow from the roof described above.

Still further, in the example embodiment, the foldable radiating fin 15 is provided that controls the transfer of heat (the heat Q1 and the heat Q2) between the battery 11 and the water storage tank 13. This allows the transfer of the heat Q1 and the heat Q2 between the battery 11 and the water storage tank 13 to be effectively controlled based on the open/closed state of the foldable radiating fin 15.

In view of the above, in the example embodiment, it is possible to improve the cooling efficiency of the battery 11 while improving, for example, the convenience.

Further, in the example embodiment, the radiating fin 15 may be controlled to be opened if the temperature T1 of the battery 11 is higher than the temperature T2 of the cooling water W, and may be controlled to be closed if the temperature T1 of the battery 11 is lower than the temperature T2 of the cooling water W. Thus, in the former case, i.e., in the case where T1>T2 is satisfied, it is possible to promote the transfer of the heat Q1 from the battery 11 to the cooling water W by opening the radiating fin 15, and in the latter case, i.e., in the case where T1<T2 is satisfied, it is possible to suppress the transfer of the heat Q2 from the cooling water W to the battery 11 by closing the radiating fin 15. Accordingly, it is possible to further effectively control the transfer of the heat Q1 and the heat Q2 between the battery 11 and the water storage tank 13. This makes it possible to further improve the cooling efficiency of the battery 11.

Although the disclosure has been described above by way of the example embodiment, the disclosure is not limited thereto, and various modifications can be made.

For example, configurations (e.g., types, shapes, positions, and the number) of each member included in, for example, the electrically powered vehicle 1 are not limited to those described in the above example embodiment. In other words, regarding the configurations, other types, other shapes, other positions, and other number, for example, may be employed for the members. In one example, the number of nozzles may be only one, rather than the plural number (three) as described in the example embodiment, or may be two or four or more, for example. Further, the positions at which the respective nozzles are to be disposed are not limited to the positions described in the example embodiment, and the nozzles may be disposed in other parts of the body 10.

Further, for example, the values of various parameters, the ranges of the various parameters, and the magnitude relations between the various parameters described in the example embodiment are not limited to those described in the example embodiment, and other values, ranges, magnitude relations may be employed.

Still further, in the above-described example embodiment, some exemplary operations of the vehicle battery cooling system (various exemplary control processes to be performed by the processor) have been described; however, the disclosure is not limited to the exemplary operations (the exemplary control processes). In other words, the exemplary control processes may be performed by using another method, for example.

In addition, the series of processes described in the example embodiment may be performed by hardware (circuitry), or may be performed by software (a program). In a case where the series of processes are to be performed by the software, the software is configured as a program group for causing a computer to execute operations. Each program may be used by being incorporated in the computer in advance, or may be used by being installed in the computer from a network or a recording medium.

Further, the various examples described above may be applied in any combination.

Note that the example effects described herein are merely illustrative and exemplary, and not limiting. The disclosure may further have other effects.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 18 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 18. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 18 illustrated in FIG. 1.

The invention claimed is:

1. A vehicle battery cooling system configured to cool a battery built in an electrically powered vehicle, the vehicle battery cooling system comprising:
   a water storage tank disposed inside the electrically powered vehicle and in a vicinity of the battery, the water storage tank being configured to store cooling water for cooling the battery;
   a circulating mechanism configured to cause, when electric power is supplied from an external facility to the battery, the cooling water supplied from the external facility to circulate through the battery and the water storage tank;
   a nozzle configured to inject the cooling water supplied from the circulating mechanism into a predetermined part of a body of the electrically powered vehicle;
   a radiating fin that is foldable and configured to control transfer of heat between the battery and the water storage tank; and
   a processor configured to control respective operations of the circulating mechanism and the nozzle, and switching between an open state and a closed state of the radiating fin.

2. The vehicle battery cooling system according to claim 1, wherein the processor is configured to control the switching between the open state and the closed state of the radiating fin based on a magnitude relation between a temperature of the battery and a temperature of the cooling water.

3. The vehicle battery cooling system according to claim 2, wherein the processor is configured to control
   the radiating fin to be opened when the temperature of the battery is higher than the temperature of the cooling water, and
   the radiating fin to be closed when the temperature of the battery is lower than the temperature of the cooling water.

4. The vehicle battery cooling system according to claim 1, wherein the processor is configured to control the operation of the nozzle based on whether or not data indicating a residence of a user of the electrically powered vehicle or data indicating a current location upon charging the electrically powered vehicle represents either of a cold region or a coast area.

5. The vehicle battery cooling system according to claim 2, wherein the processor is configured to control the operation of the nozzle based on whether or not data indicating a residence of a user of the electrically powered vehicle or data indicating a current location upon charging the electrically powered vehicle represents either of a cold region or a coast area.

6. An electrically powered vehicle comprising:
   a vehicle battery cooling system configured to cool a battery built in an electrically powered vehicle,
   wherein the vehicle battery cooling system comprises:
      a water storage tank disposed inside the electrically powered vehicle and in a vicinity of the battery, the water storage tank being configured to store cooling water for cooling the battery;
      a circulating mechanism configured to cause, when electric power is supplied from an external facility to the battery, the cooling water supplied from the external facility to circulate through the battery and the water storage tank;
      a nozzle configured to inject the cooling water supplied from the circulating mechanism into a predetermined part of a body of the electrically powered vehicle;
      a radiating fin that is foldable and configured to control transfer of heat between the battery and the water storage tank; and
      a processor configured to control respective operations of the circulating mechanism and the nozzle, and switching between an open state and a closed state of the radiating fin.

* * * * *